United States Patent

[11] 3,602,081

[72] Inventor Fred Ballas
 117 Baumford Ave. S.E., Canton, Ohio 44707
[21] Appl. No. 860,484
[22] Filed Sept. 24, 1969
[45] Patented Aug. 31, 1971

[54] LUBRICATING DEVICES
 2 Claims, 1 Drawing Fig.
[52] U.S. Cl. .................................................. 83/637,
 83/169, 83/701, 184/5, 308/4 C
[51] Int. Cl. ...................................................... B26d 7/26,
 F16n 7/20
[50] Field of Search ......................................... 83/637,
 701, 169, 22, 613; 184/5; 308/4 C

[56] References Cited
UNITED STATES PATENTS

| | | | |
|---|---|---|---|
| 1,311,540 | 7/1919 | Thomas .................... | 83/637 |
| 1,568,017 | 12/1925 | Danly ...................... | 83/637 |
| 2,288,136 | 6/1942 | Janiszewski .............. | 308/5 |
| 2,883,243 | 4/1959 | Whistler, Sr. et al. ..... | 83/637 X |

Primary Examiner—Frank T. Yost

ABSTRACT: This apparatus is a simple but efficient lubricating device consisting of two parts, an oil cup and a compression-type coil spring. Its purpose is to lubricate the bushings of a die set or other such device as the die set or other device is being driven up and down in a cyclic fashion as in a punch press operation.

PATENTED AUG 31 1971  3,602,081
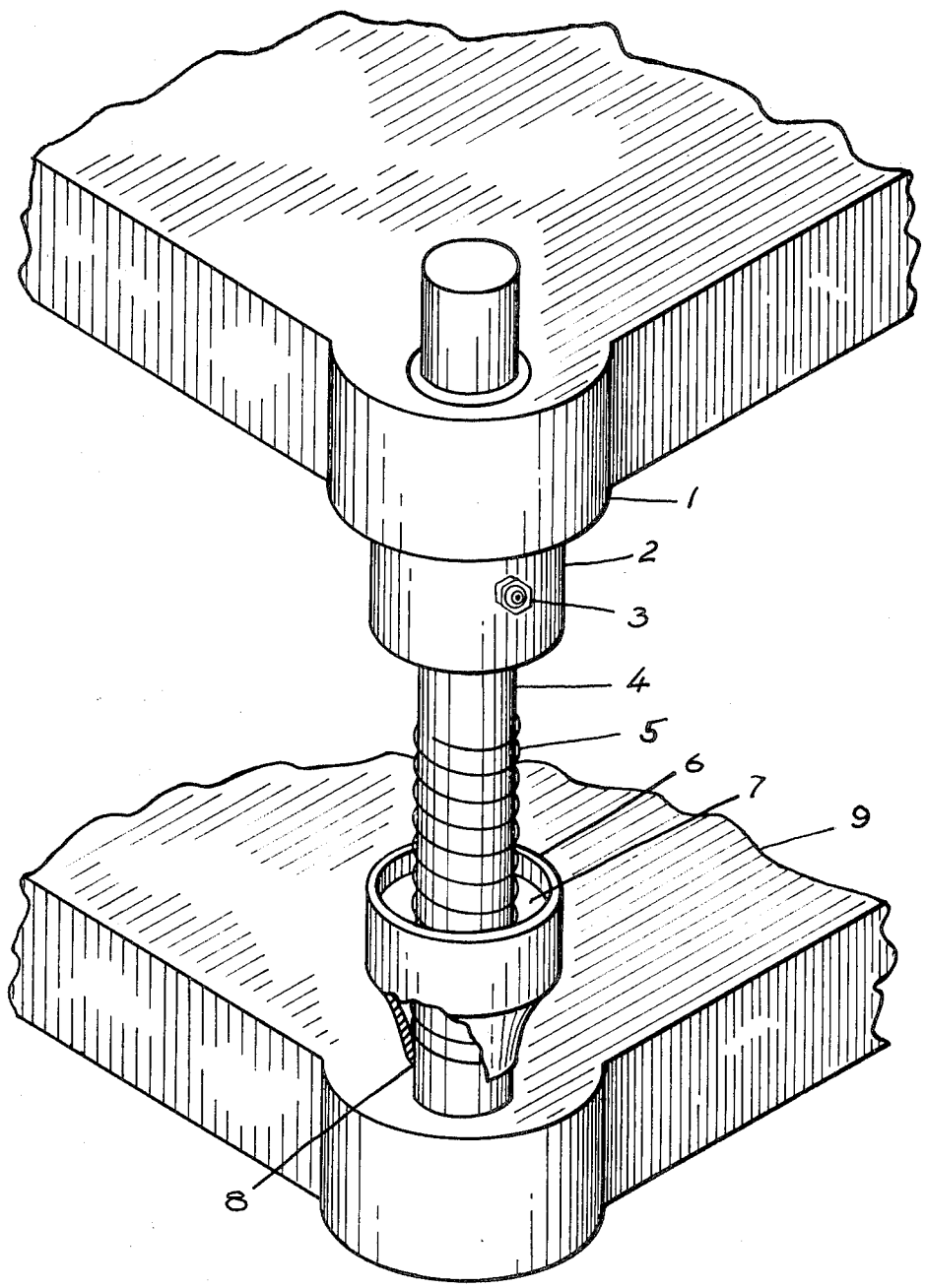
Witnesses
Richard H. Stayer
Alvin R. Engelhardt
Inventor
Fred Ballas

LUBRICATING DEVICES

My invention relates to lubricators and more particularly to lubricators of that type comprising an oil cup located below the bearing and containing a coil spring for conveying the oil to the bearing.

One specific application of my invention is the lubrication of die shoe bushings which ride on the guide posts of a die set usually used in conjunction with a punch press.

Although my invention is not restricted to the lubrication of die shoe bushings, this specific application will be referenced for convenience in the following discussion.

As heretofore constructed, die shoe bushings have been lubricated primarily by the use of grease fittings located on the periphery of the bushing. This method has proven unsatisfactory due to clogging of the grease fittings or the grease channels. Also, with present methods, it is difficult to ascertain that the bushing is being adequately lubricated. Oftentimes, irrevocable damage occurs due to a clogged or a neglected grease fitting.

To overcome these objections and to improve on the reliability and performance of existing methods of lubrication, I have devised the present invention. This invention seeks to provide a method to supply a thin film of oil to the wear surfaces of the guide post and bushing in a simple and efficient manner. The simplicity of this invention is borne out by the fact that it consists of only two parts, an oil cup and a coil spring.

The said invention further seeks to provide a lubrication device which is easily installed and a device which allows its effectiveness to be ascertained by simple visual inspection while in operation. Furthermore, the said invention is constructed in such a way as to allow the oil cup to be refilled while the lubrication device is in operation without making physical contact with any parts.

And the said invention still further seeks to provide a lubrication device which will supply adequate lubrication both at low and at high bearing speeds.

In order that the construction and operation of the said invention be clearly understood, reference is had to the accompanying drawing, in which:

FIG. 1 is an isometric view of a die set in part with my invention applied thereto, parts being in elevation.

Referring to the drawing in detail, 1 designates the upper die shoe, 2 designates the bushing, 3 the conventional grease fitting, 4 the guide post, 5 the coil spring, 6 the oil cup, 7 the oil, 8 the oil cup seal, and 9 the lower die shoe. Under normal operation the lower die shoe 9 is held fixed while the upper die shoe 1 is forced up and down as in a typical punch press operation. The guide post 4 acts as a guide for the bushing 2 which is pressed into the upper die shoe 1. The usual method of lubricating the bushing is through the grease fitting 3. My invention consists of an oil cup 6 and a coil spring 5. The oil cup 6 fits snugly on the guide post 4 and acts as an oil reservoir. The oil cup 6 is so positioned on the guide post 4 so that when the upper die shoe 1 is in its lowest most state, the coil spring is compressed and is nearly fully submerged in the oil 7. While submerged, coil spring 5 absorbs oil onto its surface. The subsequent upward movement of the upper die shoe 1 allows the coil spring 5 to expand beyond the top of the oil cup 6 and carry the adsorbed oil up the guide post 4. In the process of expanding, the coil spring 5 transfers oil from the coil spring 5 to the guide post 4 since the inside diameter of the coil spring 5 is just slightly larger than the outside diameter of the guide post 4. The thin film of oil transferred to the guide post 4, then lubricates the bushing 2, since bushing 2 rides on guide post 4. The oil cup seal 8 prevents oil from leaking out of the oil cup 6.

While the description and drawing given are a preferred embodiment of my invention, it will be readily understood by those skilled in the art that the same may be modified in various ways to meet any particular or peculiar requirement, without departing from the spirit of my invention.

It will thus be seen that I have provided a simple, inexpensive, efficient, and clogproof method of lubrication which allows its effectiveness to be determined by visual inspection and which obviates the necessity of using the conventional grease fitting as a means of lubrication. Also, I have provided a device which can easily be refilled with oil without making physical contact with the device and a device which will operate at low and at high bearing speeds.

Having thus described the invention, What I claim is:

1. The combination with a die set comprising the usual upper die shoe, lower die shoe, guide posts and bushings, the said guide posts oriented substantially vertical, and the said upper die shoe and bushings being driven up and down on the guide posts by the usual means, of an oil cup containing oil and mounted coaxially one on each said guide post, the lower internal diameter of said oil cup sealing on said guide post to prevent oil leakage, a loose fitting coil spring supported by said oil cup and spiraling up and around said guide post and projecting beyond the top of said oil cup with the purpose of conveying oil from said oil cup to said guide post and bushing.

2. The combination with a cylinder oriented in a substantially vertical manner upon which rides a bearing being driven up and down in a regular fashion, of an oil cup containing oil and mounted coaxially on said cylinder, the lower internal diameter of said oil cup sealing on said cylinder to prevent oil leakage, a loose-fitting coil spring supported by said oil cup and spiraling up and around said cylinder and projecting beyond the top of said oilcup with the purpose of conveying oil from said oil cup to said cylinder and bearing.